Feb. 17, 1925.
F. H. CLOUGH
1,526,773
ELECTRIC MOTOR DRIVE
Filed June 12, 1922
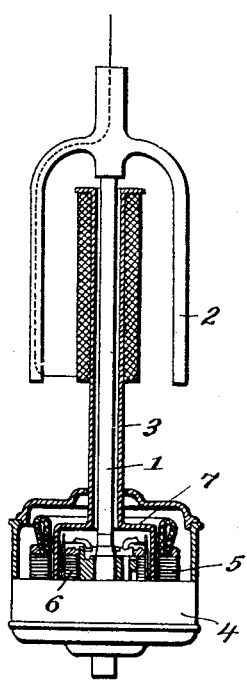
Inventor:
Frederick Horton Clough
by Albert G. Davis
His Attorney Patented Feb. 17, 1925.

1,526,773

UNITED STATES PATENT OFFICE.

FREDERICK H. CLOUGH, OF HILLMORTON, NEAR RUGBY, ENGLAND, ASSIGNOR TO GENERAL ELECTRIC COMPANY, A CORPORATION OF NEW YORK.

ELECTRIC-MOTOR DRIVE.

Application filed June 12, 1922. Serial No. 567,721.

*To all whom it may concern:*

Be it known that I, FREDERICK HORTON CLOUGH, a subject of the British Empire, residing at Hillmorton, near Rugby, England, have invented certain new and useful Improvements in and Relating to Electric-Motor Drives, of which the following is a specification.

This invention relates to electric motor drives and is particularly applicable to the driving of machinery having parts designed to rotate at slightly different speeds.

In certain kinds of machinery, for example, machinery used in the preparation and spinning of cotton, there are two shafts or other members which rotate at approximately the same speed, but in which there is a small difference in speed which has to be controlled. Cases of this kind occur in slubbers and intermediate flyers, rovers and fly-frames, and it is the custom to arrange the separate shafts concentrically one inside the other and to drive them separately at different speeds, for example, to employ differential mechanism to enable the difference in the speed to be controlled or to drive one member by friction from the other and to apply a braking mechanism to the frictionally driven member to produce the necessary retardation.

The present invention provides electrical apparatus for driving such members at slightly different speeds, and to effect this purpose according to the invention, the members are driven by a motor having two rotors, one driving each of the two above-mentioned shafts or other members.

For a better understanding of my invention, reference may be had to the following description taken in connection with the accompanying drawing, in which the single figure shows a machine having an electric motor drive in accordance with my invention.

The drawing illustrates my electric drive for a machine employed for spinning flax or similar material. The central vertical spindle 1 has fixed at its upper end the flyer frame 2. Surrounding the spindle 1 and concentric therewith is a tubular shaft 3 upon the upper part of which the bobbin upon which the fibre is to be wound is placed. It will be realized that it is necessary to drive the spindle 1 and the hollow shaft 3 at slightly different speeds in order to enable winding to take place. The hollow shaft 3 will be driven at a slightly smaller speed than the spindle 1.

According to the invention this drive is effected by means of a motor such as an induction motor 4, the stator of which to which power is supplied being shown at 5. The spindle 1 forms the shaft of the rotor 6 which is of similar construction to a small squirrel cage armature and as there is practically no load upon the spindle 1, the latter will be rotated at substantially the synchronous speed corresponding to the frequency of the supply to the stator 5.

The tubular shaft 3 at its lower end carries a spider 7 which carries conductor bars which are located in the air gap between the stator 5 and central rotor 6. These conductors form a second rotor which would rotate at the same speed as the rotor 6 when the tubular shaft 3 is unloaded. When winding is going on, however, the drag of the fibre such as hemp or cotton yarn increases the slip of the second rotor so that the shaft 3 rotates at a slightly smaller speed than the spindle 1 and independently thereof.

It is well known that the actual slip of an induction motor can be changed by varying the voltage supplied to the winding of the stator 5 and in accordance with the present invention, the difference in speed between the spindle 1 and the hollow shaft 3 can be adjusted to any desired extent by varying the voltage supplied to the stator winding.

Other forms of motors can be employed according to the invention, for example, the rotor may consist of an iron core with definite poles produced either by permanent magnets or direct current windings. In this case the central rotor will rotate at synchronous speed. The second rotor revolving in the air gap may in the case of such a small motor consist of a metal cylinder. Furthermore, the rotors may be placed side by side within the stator.

While this type of drive is peculiarly suitable for use in connection with spinning machinery, the invention is not limited to such an application, but it may be employed wherever it is required to drive two members of a machine at slightly different speeds.

What I claim as new and desire to secure by Letters Patent of the United States, is:—

1. In combination, a machine having two parts adapted to rotate at slightly different speeds, said parts being capable of independent rotation with respect to each other, a motor having a single stator and two rotors designed to operate at slightly different speeds, one of said rotors being connected to and adapted to drive one part of said machine and the other of said rotors being connected to the other part of said machine and adapted to drive said other part at a different speed from said first mentioned part.

2. In combination, a machine having two parts adapted to rotate at slightly different speeds, said parts being capable of independent rotation with respect to each other, a motor having a single stator and two rotors designed to operate at slightly different speeds, a shaft driven by one of said rotors and on which one of said parts of said machine is mounted, a second shaft surrounding the first mentioned shaft and driven by the other of said rotors at a different speed from said first mentioned shaft, the other part of said machine being mounted on said second shaft.

3. In combination, a machine having two parts adapted to rotate at slightly different speeds, said parts being capable of independent rotation with respect to each other, an alternating current motor having a single stator and two rotors, one of said rotors being driven as the rotor of an induction motor, one of said rotors being connected to and adapted to drive one part of said machine, and the other of said rotors being connected to the other part of said machine and adapted to drive said other part at a different speed from said first mentioned part.

4. In combination, a machine having two parts adapted to rotate at slightly different speeds, said parts being capable of independent rotation with respect to each other, an alternating current motor having a single stator and two rotors, one of said rotors being driven as the rotor of an induction motor, a shaft driven by one of said rotors and on which one of said parts of said machine is mounted, a second shaft surrounding the first mentioned shaft and driven by the other of said rotors at a speed different from said first mentioned shaft, the other part of said machine being mounted on said second shaft.

5. In combination, a machine having two parts adapted to rotate at slightly different speeds, said parts being capable of independent rotation with respect to each other, a motor having a single stator and two rotors, one of said rotors being located in the air gap between the stator and the other rotor, one of said rotors being connected to and adapted to drive one part of said machine and the other of said rotors being connected to the other part of said machine and adapted to drive said other part at a different speed from said first mentioned part.

6. In combination, a machine having two parts adapted to rotate at slightly different speeds, an alternating current motor having a single stator and two rotors, one of said rotors being located in the air gap between the stator and the other rotor and being driven as the rotor of an induction motor, one of said rotors being connected to one part of said machine and the other of said rotors being connected to the other part of said machine.

7. In combination, a machine having two parts adapted to rotate at slightly different speeds, an alterating current motor having a single stator and two rotors, one of said rotors being located in the air gap between the stator and the other rotor and being driven as a rotor of an induction motor, a shaft on which one of said rotors and one of said parts of said machine are mounted, a second shaft surrounding the first mentioned shaft and on which the other of said rotors and the other part of said machine are mounted.

In witness whereof, I have hereunto set my hand this twenty-fifth day of May, 1922.

FRED. H. CLOUGH.